United States Patent Office 3,558,620
Patented Jan. 26, 1971

3,558,620
ANTHRAQUINONE REACTIVE DYESTUFFS
Hans-Samuel Bien, Burscheid, Erich Klauke, Odenthal-Hahnenberg, and Klaus Wunderlich, Leverkusen, Germany, assignors to Farbenfabriken Bayer Aktiengesellschaft, Leverkusen, Germany, a corporation of Germany
No Drawing. Filed May 24, 1968, Ser. No. 731,710
Claims priority, application Germany, June 2, 1967, F 52,584
Int. Cl. C07d 55/46
U.S. Cl. 260—249                                      13 Claims

ABSTRACT OF THE DISCLOSURE

Anthraquinone reactive dyestuffs useful in dyeing hydroxyl and nitrogen-containing textiles having a nucleus consisting of a substituted or unsubstituted 1-amino-2-sulfo-4 [substituted or unsubstituted ,(4'-amino- or alkylene amino-triazinyl) analino] anthraquinone. The dyestuffs show improved fastness properties.

---

The invention relates to valuable new anthraquinone reactive dyestuffs of the formula

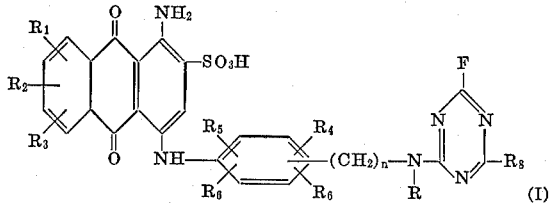

(I)

In this formula $R_1$ and $R_2$ represent, independently of one another, hydrogen or substituents, $R_3$ stands for a substituent, $R_4$ to $R_7$ stand, independently of one another, for hydrogen or substituents, $n$ is the number 0, 1 or 2, R stands for hydrogen or for a substituent, $R_8$ stands for an amino or hydrazino group or for a hydrocarbon radical which may be linked via O, N or S and which may be further substituted, and F stands for a fluorine substituent.

Suitable substituents $R_1$, $R_2$ or $R_3$ are, for example, hydroxyl, amino and sulphonic acid groups. The left nucleus of the anthraquinone molecule contains by definition, at least one substituent $R_3$, i.e., for example, a sulphonic acid, an amino or a hydroxyl group. Valuable dyestuffs are especially those which contain a sulphonic acid group in the 5-, 6-, 7- or 8-position and contain one or two hydroxyl and/or amino groups in the 5- and/or 8-position. The amino groups may exhibit further substituents, particularly hydrocarbon radicals, such as methyl, ethyl or propyl groups; or aryl groups, such as phenyl radicals and substituted phenyl radicals, for example, o, m or p-toluyl radicals; and sulphophenyl radicals.

Suitable substituents $R_4$, $R_5$, $R_6$ or $R_7$ are, for example, sulphonic acid, alkyl, alkoxy or halogen substituents. Of the alkyl groups, particularly lower alkyl groups, such as methyl and ethy substituents, in the o,o'-position to the NH group or in the o-, m- or p-position to the NH group are preferred. One group of vauable dyestuffs contains, as substituents $R_4$, $R_5$, $R_6$ or $R_7$, one or two sulphonic acid groups in the o-, m- of p-position or in the 2,4- or 2,5- position to the NH group of the phenyl nucleus.

Of the substituents R, especially lower alkyl groups, such as methyl and ethyl groups, are preferred.

Suitable radicals $R_8$ on the carbon atom of the triazine ring are the following: —NH₂; substituted amino groups, such as NHCH₃, —N(CH₃)₂, —NHC₂H₅, —N(C₂H₅)₂, —NHC₃H₇, —NH—C₄H₉; arylamino groups, such as phenylamino groups and substituted phenyl-amino groups, e.g. o-, m- or p-sulphophenyl-amino groups 2,4-, 2,5- and 3,5-disulphophenylamino, o-, m- or p-chlorophenylamino, o-, m- or p-methylphenylamino, p-nitrophenylamino groups; ether and thioether groups, such as methoxy, ethoxy, propoxy, phenoxy and substituted phenoxy radicals; methylthio, ethylthio and phenylthio groups as well as substituted phenylthio groups; hydrocarbon radicals, such as lower alkyl groups, e.g., methyl, ethyl and propyl radicals; or aryl radicals, such as phenyl and substituted phenyl radicals; e.g., chlorophenyl, methylphenyl, nitrophenyl and sulphophenyl radicals.

Suitable triazine rings

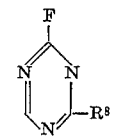

(II)

are, for example, 2-fluoro-4-amino-6-triazinyl, 2-fluoro-4-methylamino-6 - triazinyl, 2 - fluoro-4-phenylamino-6-triazinyl, 2-fluoro-4-(o-, m- or p-sulphophenyl)-amino-6-triazinyl, 2-fluoro-4-(2',4'- or 2',5'- or 3',5'- or 4,5-disulphophenyl)-amino-6-triazinyl, 2-fluoro-4-dimethylamino-6-triazinyl, 2-fluoro-4-methoxy-6-triazinyl, 2-fluoro-4-(β-methoxy-ethoxy)-6-triazinyl, 2-fluoro-4-hydrazino-6-triazinyl, 2-fluoro-4-phenoxy-6-triazinyl, 2-fluoro-4-(2'-, 3'- or 4'-sulphophenoxy)-6-triazinyl, 2-fluoro-4-benzyloxy-6-triazinyl, 2-fluoro-4-(β-hydroxyethoxy)-6-triazinyl, 2-fluoro-4-(β-hydroxyethylmercapto)-6-triazinyl, 2-fluoro-4-methyl-6-triazinyl, 2-fluoro-4-phenyl-6-triazinyl, 2-fluoro-4-(2'-, 3'- or 4'-sulphophenyl)-6-triazinyl, 2-fluoro-4-diethylamino-6-triazinyl, 2-fluoro-4-(β-bis-hydroxyethylamino)-6-triazinyl, 2-fluoro-4-methylmercapto-6-triazinyl, 2-fluoro-4-methylmercapto-6-triazinyl, 2-fluoro-4-phenylmercapto-6-triazinyl, 2-fluoro-4-(2'-, 3'- or 4'-chlorophenylmercapto)-6-triazinyl or 2-fluoro-4-(2'-, 3'- or 4'-sulphophenyl-mercapto)-6-triazinyl.

The new dyestuffs are obtained by reacting amino-anthraquinone compounds of the formula

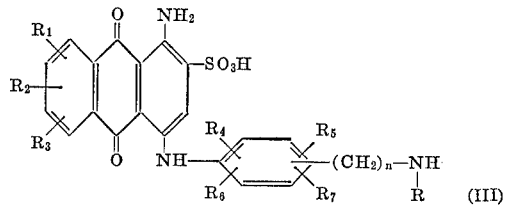

(III)

in which R to $R_7$ and $n$ hrave the same meaning as above, with fluorotriazine compounds of the formula

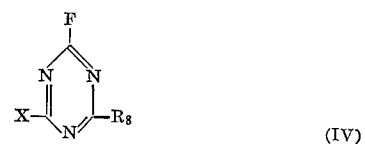

(IV)

in which $R_8$ and F have the same meaning as above and X stands for an anionically splittable radical.

The fluorine substituent has a preferred interest among the reactive substituents X which can be split off an anionic radicals. Further anionically splittable radicals which are suitable, as the case may be, are quaternary ammonium groups, such as $$-\overset{+}{N}(CH_3)_3 \text{ and } -\overset{+}{N}(C_2H_5)_3$$

for example.

According to another method of production, the new dyestuffs are obtained in such a manner that anthraquinone dyestuffs of the formula

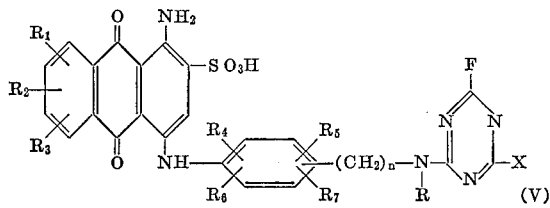

in which R to $R_7$, $n$ and F as well as X have the same meaning as above, are condensed, for example, with ammonia or amino, hydroxy or thio compounds which contain a reactive hydrogen atom, while splitting off HX. In this way dyestuffs are obtained in which the substituent $R_8$ of the products of the Formula I stands, for example, for an amino group or for a hydroxy ether or thioether grouping, which are linked with the carbon atom of the triazine ring via the —O or —S atom.

Triazine compounds suitable for the above-mentioned reactions are the following, for example: 2,4,6-sym.-trifluoro-triazine, 2,4-difluoro-6-amino-sym.-triazine, 2,4-difluoro-6-methylamino-sym.-triazine, 2,4 - difluoro-6-ethylamino-sym.-triazine, 2,4 - difluoro-6-phenylamino-sym.-triazine, 2,4 - difluoro-6-(2'- or 4'- or 6'-sulphophenyl)-amino-sym.-triazine, 2,4-difluoro-6-(2',4'- or 3',4'- or 2',5'- or 4',5'-disulphophenyl)amino-sym.-triazine, 2,6-difluoro-4-dimethylamino-triazine, 2,6-difluoro-4-methoxy-triazine, 2,6-difluoro-4-(β-methoxy-ethoxy)-triazine, 2,6 - difluoro-4 - hydrazino - triazine, 2,6-difluoro-4-phenoxy-triazine, 2,6-difluoro-4-(2-, 3- or 4-sulphophenoxy)-triazine, 2,6-difluoro - 4 - benzyloxy-triazine, 2,6-difluoro-4-(β-hydroxyethylmercapto-triazine, 2,6-difluoro-4-methyl-triazine, 2,6-difluoro-4-phenyl-triazine, 2-6-difluoro-4-(2'-, 3'- or 4'-sulphophenyl) - triazine, 2,6-difluoro-4-ethylmercapto-triazine, 2,6 - difluoro-4-(β-hydroxyethylamino)-triazine, 2,6-difluoro - 4 - methyl-mercapto-triazine, 2,6-difluoro-4-phenylmercapto-triazine, 2,6 - difluoro - 4-(2'-, 3'- or 4'-chloro - phenylmercapto)-triazine or 2,6-difluoro-4-(2'-, 3'- or 4'-sulphophenylmercapto)-triazine.

The above-mentioned and further fluorotriazine compounds which can be used according to the invention can, in general, readily be obtained by reacting the appropriate chlorine or bromine compounds with alkali metal fluorides, e.g., with potassium fluoride, NaHF, $KSO_2F$, $SOF_3$ and $AgF_2$, or by reacting the appropriate OH compound with $SF_4$, $COF_2$, COClF or cyanofluoride, or by heating appropriate diazonium tetrafluroborates.

The reaction of the amino-anthraquinone compounds with heterocyclic components (IV) and the reaction of dyestuffs of the Formula V with, for example, amino, hydroxy or thio compounds is carried out, dependent upon the type of the starting compounds used, in an organic, organic-aqueous or aqueous medium at temperatures ranging from —10° C. to 100° C., preferably from 0° C. to 50° C., in the presence of alkaline condensing agents, such as aqueous alkali metal carbonate or alkali metal hydroxide solutions.

A further modification for the preparation of the new dyestuffs of the Formula I, which may be applied in some cases, consists in that in amino-anthraquinone dyestuffs of the formula

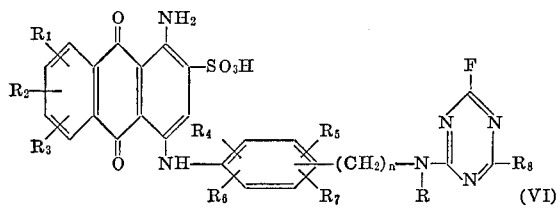

in which R to $R_8$ and $n$ have the same meaning as above, and

Y represents an anionically splittable radical with the exception of a fluorine substituent, Y is exchanged in known manner for a fluorine substituent.

The exchange of a substituent Y, e.g., of the chlorine or bromine atoms for fluorine substituents, can be carried out in the manner already described.

Some of the anthraquinone reactive dyestuffs obtainable according to the various methods described may also subsequently be sulphonated, e.g., with the aid of oleum.

The new dyestuffs are extremely valuable products which are suitable for the greatest variety of purposes of application. In the form of water-soluble compounds, they have a preferred importance for the dyeing of hydroxyl group-containing and nitrogen-containing textile materials, in particular of textile materials obtained from natural and regenerated cellulose as well as of wool, silk, synthetic polyamide and polyurethane fibres. Due to the reactive fluorine substituent or substituents in the triazine ring, the products are especially well suited as reactive dyestuffs for the dyeing of cellulose materials according to the methods which have recently become known for this purpose. The fastness properties obtained are excellent, in particular the fastness to wet processing.

For the dyeing of cellulose, the dyestuffs are preferably used in an aqueous solution which can be mixed with alkaline reacting substances, such as alkali metal hydroxide or alkali metal carbonate, or with compounds which are converted into alkaline reacting substances, such as alkali metal bicarbonate, $Cl_3C$-COONa. Further auxiliary agents may be added to the solution, but these should not react with the dyestuffs in an undesirable manner. Such additives are, for example, surface-active substances, such as alkylsulphates, or materials or dyeing auxiliary products preventing the migration of the dyestuff, such as urea, or inert thickening agents, such as oil-in-water emulsions, tragacanth, starch, alginate or methyl cellulose.

The solutions or pastes thus prepared are applied to the material to be dyed, for example, by padding on the foulard (short bath) or by printing, followed by heating for some time to an elevated temperature, preferably to 40 to 150° C. Heating may be carried out in the hot flue, in a steam apparatus, on heated rollers, or by the introduction into heated concentrated salt baths, either alone or successively in any desired sequence.

When a padding or dyeing liquor without alkali is used, a passage of the dry material is subsequently carried out through an alkaline-reacting solution to which common salt or Glauber salt is added. The salt addition thus reduces the migration of the dyestuff from the fibre.

It is also possible to pretreat the material to be dyed with acid-binding agents mentioned above, subsequently treating it with the solution or paste of the dyestuff and finally, as stated, fixing it at an elevated temperature.

When dyeing is carried out from a long bath, the material is introduced at room temperature into an aqueous solution of the dyestuff (goods-to-liquor ratio 1:5 to 1:40, and dyed for 40 to 90 minutes, while optionally raising the temperature up to 20 to 60° C., with the portionwise addition of salt, e.g., sodium sulphate, and subsequently of alkali, for example, sodium phosphates, sodium carbonate, NaOH or KOH.

In this way, a chemical reaction takes place between the dyestuff and the fibre. When the chemical fixation is completed, the dyed material is rinsed hot and finally soaped, non-fixed resides of the dyestuff thus being removed. Eminently fast dyeings, which are especially fast to wet processing and light, are obtained.

In the so-called cold-bath-padding process a subsequent heating of the padded fabric may be dispensed with by storing the fabric at room temperature for some time, e.g., for 2 to 20 hours. A stronger alkali is used in this process than that which has been used in the dyeing process from a long bath described above.

For printing materials containing hydroxy groups, a printing paste is used consisting of the dyestuff solution, a thickening agent, such as sodium alginate, and a compound of alkaline reaction or splitting off alkali upon heating, such as sodium carbonate, sodium phosphate, potassium carbonate, potassium acetate or sodium and potassium hydrogen carbonate, and the printed material is rinsed and soaped.

Textile materials containing amide groups, such as wool, silk, synthetic polyamide and polyurethane fibres, are generally dyed in the acidic or neutral range according to the dyeing methods customary for this purpose, a final increase of the pH value of the dyebath, e.g. to pH 7 to pH 9, sometimes being of advantage.

The dyestuffs are applied, for example, to wool and silk in the form of solutions, and to synthetic polyamide fabrics in the form of solutions or, preferably, in a dispersed form followed by an aftertreatment, optionally together with acid-binding agents (preferably in rather small amounts), such as sodium carbonate. Particularly favourable results are obtained on synthetic superpolyamides with those dyestuffs which are insoluble or only sparingly soluble in water. These are worked up by conventional methods and with the addition of the known auxiliary agents into a dyestuffs dispersion and used as such in the dyebath and/or padding bath or in a printing paste. Auxiliary agents suitable for being used in this way are inter alia compounds which prevent the dyestuff to migrate from the fibre, such as cellulose ethers, alkali metal chlorides and sulphates; wetting agents, such as condensation products from ethylene oxide and fatty alcohols or phenols, sulphonated fatty alcohols; solvents, such as thiodiglycol, as well as thickening agents, such as starch, tragacanth, alginate thickening, gum arabic etc.

The aftertreatment of the dyeings, impregnations and prints obtained on polyamide fabrics is preferably carried out at a temperature of 50 to 110° C. and for a period of time ranging from 5 to 60 minutes.

The dyeings obtainable with the new dyestuffs are generally distinguished by good to very good fastness properties, especially by an excellent fastness to wet processing.

The parts in the following examples are parts by weight.

In an analogous manner, the amino-anthraquinone derivatives set out in the following Table can be converted into valuable reactive dyestuffs, the shades of which on cotton are indicated:

| Water-soluble amino-anthraquinone derivative | Shade |
| --- | --- |
| 1-amino-4-(4'-N-methylaminomethylanilino)-anthraquinone-2,6,2'-trisulphonic acid. | Greenish blue. |
| 1-amino-4-(4'-N-methylaminomethylanilino)-anthraquinone-2,5,8-trisulphonic acid. | Do. |
| 1-amino-4-(4'-N-methylaminomethylanilino)-anthraquinone-2,8-disulphonic acid. | Blue. |
| 1-amino-4-(4'-aminoanilino)-anthraquinone-2,6-disulphonic acid. | Blue-green. |
| 1-amino-4-(4'-aminoanilino)-anthraquinone-2,5-disulphonic acid. | Greenish |
| 1-amino-4-(3'-aminoanilino)-anthraquinone-2,6-disulphonic acid. | Blue. |
| 1-amino-4-(3'-aminoanilino)-anthraquinone-2,5-disulphonic acid. | Do. |

EXAMPLE 2

9.5 parts 1-amino-4-(4'-aminophenylamino)-anthraquinone-2,6,2'-trisulphonic acid are dissolved in 95 parts of water followed by the dropwise addition of 20 to 25° C. of 2,4-difluoro-6-β-methoxyethoxy)-triazine. The pH value is maintained at 6 to 7. When the reaction is completed, the precipitated product is filtered off with suction and washed with a common salt in solution. It is dried at 30 to 40° C. in a vacuum.

The dyestuff has the following constitution:

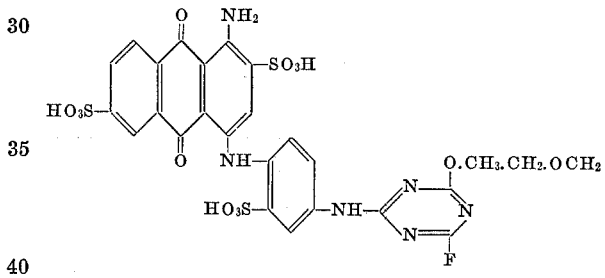

In an analogous manner further valuable reactive dyestuffs can be produced from the components set out in the following Table, which dye wool and cotton in the specified shades:

| Dyeing compound | Reactive group | Shade |
| --- | --- | --- |
| 1-amino-4-(4'-aminophenylamino)-anthraquinone-2,6,3'-trisulphonic acid | 2,4-difluoro-6-methoxy-triazine | Blue-green. |
| 1-amino-4-(4'-N-methyl-aminomethyl-anilino)-anthraquinone-2,7,2'-trisulphonic acid | 2,4-difluoro-6-methylmercapto-triazine | Greenish blue. |
| 1-amino-4-(4'-aminoanilino)-anthraquinone-2,7-disulphonic acid | 2,4-difluoro-6-diethylaminotriazine | Blue-green. |
| 1-amino-4-(4'-N-methyl-aminomethyl-anilino)-anthraquinone-2,7,2'-trisulphonic acid | 2,4-difluoro-4-amino-triazine | Greenish blue. |

EXAMPLE 1

63 parts 1-amino-4-(4'-aminophenyl)-aminoanthraquinone-2,5,8-trisulphonic acid are dissolved in 630 parts of water and the pH is adjusted to 6 with a sodium hydroxide solution; 22 parts 2,4-difluoro-6-β-methoxy-ethoxytriazine are then added dropwise at 0 to 5° C., and a pH of 6 to 7 is maintained with a sodium carbonate solution. When the reaction is completed, the product is salted out with potassium chloride, filtered off with suction and washed with a 20% potassium chloride solution. The dyestuff obtained in the form of small blue-green needles is dried at 30 to 40° C. in a vacuum. It probably corresponds to the following formula

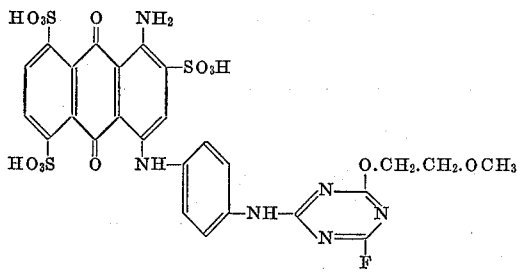

and dyes cotton in greenish blue shades.

EXAMPLE 3

6.1 parts 1-amino-4-(3'-aminomethyl-2',6-dimethylanilino)-anthraquinone-2,6,5'-trisulphonic acid are dissolved in 65 parts of water and acylated at a pH value of 6 with 3 parts 2,4-difluoro-6-ethoxy-triazine. The pH value is adjusted with a 2 N sodium hydroxide solution. The resultant dyestuff is salted out with potassium chloride, washed with a 20% potassium chloride solution and dried at 40° C. in a vacuum. The dyestuff obtained

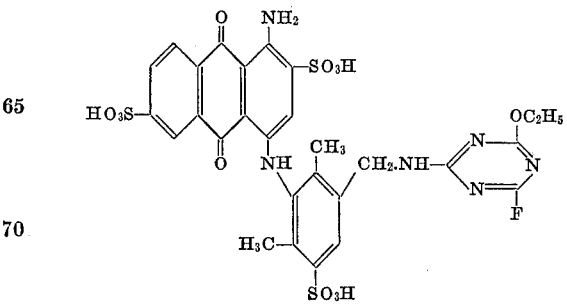

dyes wool in clear blue shades fast to wet processing.

EXAMPLE 4

7,8 parts 1-amino-4-(3'-N-methylaminomethyl-2',6'-dimethylanilino)-anthraquinone-2,6,5'-trisulphonic acid are acylated in 85 parts of water at 20–25° C. with 3.0 parts 2,4-difluoro-6-β-methoxyethoxy-triazine. A pH value of 6 to 6.5 is maintained during the reaction with a 2 N sodium carbonate solution. Before rapidly adding 20 parts of common salt, the pH is adjusted to about 4. The precipitated dyestuff is washed with a saturated common salt solution.

The resultant dyestuff

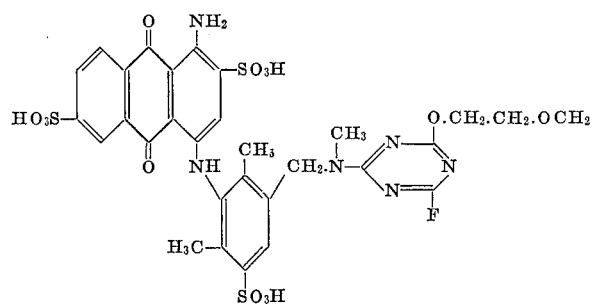

dyes wool or cotton in clear blue shades which are fast to wet processing.

100 parts by weight of a cotton fabric are padded on the foulard at room temperature with an aqueous solution containing 2% of the dyestuff corresponding to the formula of this example, 15 g./litre sodium hydrogen carbonate and 150 g./liter urea, intermediately dried, heated at 140° C. for 30 seconds, then rinsed and soaped at the boil. The fabric is dyed in very clear blue shades fast to wet processing.

50 g. of a cotton hank are dyed in 1 litre of a dyebath containing 1.5 g. of the dyestuff corresponding to the formula of this example, by adding 50 g. of common salt in several portions at 20 to 30° C. in the course of 30 minutes, followed by the addition of 20 g. sodium carbonate and treatment at the same temperature. After rinsing, soaping at the boil, and drying, a blue dyeing of good fastness to wet processing, rubbing and light is obtained.

EXAMPLE 5

6.1 parts of 1-amino-4-(3'-aminomethyl-4'-methoxyanilino)-anthraquinone-2,6-disulphonic acid are dissolved in 65 parts of water and acylated at 20 to 30° C. at a pH value of 6 with 3 parts 2,4-difluoro-6-methylamino-triazine. The pH value is adjusted with a 2 N sodium hydroxide solution. The resultant dyestuff is salted out with potassium chloride, washed with a 10% potassium chloride solution and dried at 40° C. in a vacuum. The dyestuff obtained dyes cotton in greenish blue shades fast to wet processing.

In an analogous matter further valuable reactive dyestuffs can be prepared from the components set out in the following table, which dye cotton in the specified shades:

| Dyeing compound | Reactive group | Shade |
|---|---|---|
| 1-amino-4-(3'-aminomethyl-4'-methyl-anilino)-anthraquinone-2,5,2'-trisulfonic acid | 2,4-difluoro-6-benzylamino-triazine. | Greenish blue. |
| 1-amino-4-(3'-aminomethyl-4'-methyl-anilino)-anthraquinone-2,8-disulfonic acid | 2,4-difluoro-6-anilino-triazine | Do. |
| 1-amino-4-(3'-aminomethyl-2',6'-dimethyl-anilino)-anthraquinone-2,5,8-trisulfonic acid | 2,4-difluoro-6-o-toluidino-triazine. | Bright neutral blue. |
| 1-amino-4-(3'-N-methylaminomethyl-4'-methoxy-anilino)-anthraquinone-2,7-disulfonic acid | 2,4-difluoro-6-n-butylamino-triazine. | Blue-green. |
| 1-amino-4-(3'-N-methylaminomethyl-4'-methoxy-anilino)-anthraquinone-2,5,2'-trisulfonic acid | 2,4-difluoro-6-(N-methyl-N-phenylamino)-triazine. | Do. |
| 1-amino-4-(3'-aminomethyl-anilino)-anthraquinone-2,8,2'-trisulfinic acid | 2,4-difluoro-6-m-chloranilino-triazine. | Greenish blue. |
| 1-amino-4-(3'-aminomethyl-4'-methoxy-anilino)-anthraquinone-2,7,2'-trisulfonic acid | 2,4-difluoro-6-benzylamino-triazine. | Do. |

In an analogous manner further valuable reactive dyestuffs can be prepared from the components set out in the following table, which dye wool and cotton in the specified shades:

| Dyeing compound | Reactive group | Shade |
|---|---|---|
| 1-amino-4-(3'-N-methylaminomethyl-2',6'-dimethylanilino-anthraquinone-2,7-disulphonic acid | 2,4-difluoro-6-methoxy-triazine. | Blue. |
| 1-amino-4-(3'-N-methylaminomethyl-2',6'-dimethylanilino)-anthraquinone-2,7,5'-trisulphonic acid | 2,4-difluoro-6-phenyl-triazine. | Do. |
| 1-amino-4-(3'-amino-2'-methylanilino)-anthraquinone-2,6,5'-trisulphonic acid | 2,4-difluoro-6-phenylamino-triazine. | Greenish blue. |

When cellulose fabrics are printed with a printing paste which contains, per kilogram, 15 grams of the dyestuff of the formula of this example, 100 g. urea, 300 ml. water, 500 g. alginate thickening (60 g. sodium alginate per kg. thickening) and 20 g. sodium carbonate, and which was made up with water to 1 kilogram, dried, steamed at 10° C. for 2 minutes, rinsed with hot water and soaped at the boil, then an intense blue print of good fastness to washing and light is obtained.

EXAMPLE 6

9.8 parts 1-amino-4-(4'-amino-anilino)-anthraquinone-2,5-disulfonic acid are acylated in 100 parts of water at 20° C. and at pH 5.0 with 4.5 parts 2,4-difluoro-6-anilino-triazine. When the reaction is completed, the dyestuff is precipitated by the addition of sodium chloride, filtered off with suction, washed with a 2 percent sodium chloride solution and dried at 60° C. in a vacuum. The dyestuff dyes cotton according to the method of Example 4 in an analogous manner, the amino-anthraquinone derivatives A and the reactive components B set out in the following table can be converted into similar blue dyestuffs:

| A | B | Shade |
|---|---|---|
| 1-amino-4-(4'-amino-anilino)-anthraquinone-2,5-disulfonic acid | 2,4-difluoro-6-benzylamino-triazine | Greenish blue. |
| 1-amino-4-(4'-amino-anilino)-anthraquinone-2,5-sdiulfonic acid | 2,4-difluoro-6-n-butylamino-triazine | Greenish blue. |
| 1-amino-4-(2'-methyl-3'-amino-anilino)-anthraquinone-2,5,5'-trisulfonic acid | 2,4-difluoro-6-anilino-triazine | Blue. |
| 1-amino-4-(4'-amino-anilino)-anthraquinone-2,5,3'-trisulfonic acid | 2,4-difluoro-6-(N-methyl-N-phenyl-amino)-triazine. | Greenish blue. |
| 1-amino-4-(4'-amino-anilino)-anthraquinone-2,5,3'-trisulfonic acid | 2,4-difluoro-6-benzylamino-triazine | Greenish blue. |
| 1-amino-4-(4'-methylamino-methyl-anilino)-anthraquinone-2,5,3'-trisulfonic acid | 2,4-difluoro-6-anilion-triazine | Blue. |
| 1-amino-4-(4'-amino-anilino)-anthraquinone-2,6,2'-trisulfonic acid | 2,4-difluoro-6-n-butylamino-triazine | Greenish blue. |

We claim:
1. An anthraquinone reactive dyestuff having the formula

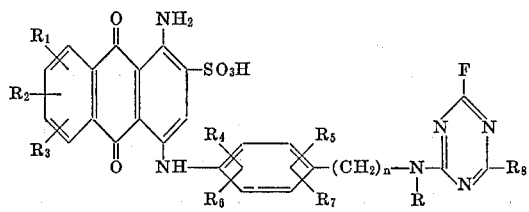

wherein $R_1$ and $R_2$ represent independently of one another hydrogen or hydroxyl, amino or sulfonic acid;
$R_3$ stands for hydroxyl, amino or sulfonic acid;
$R_4$ stands for hydrogen, sulfonic acid, lower alkyl, lower alkoxy or halogen; $R_5$, $R_6$ and $R_7$ stand independently of one another for hydrogen, lower alkyl, lower alkoxy or halogen;
$n$ stands for the number 0, 1 or 2;
$R$ stands for hydrogen or lower alkyl; and
$R_8$ stands for amino; lower alkylamino; dilower alkylamino; hydroxy lower alkylamino; di-(hydroxy lower alkyl)-amino; phenylamino; phenylamino substituted by a member selected from the class consisting of sulfo, chloro, methyl and nitro; benzylamino; hydrazino; lower alkoxy; benzyloxy; lower alkoxy substituted by lower alkoxy or hydroxy; phenoxy; sulfphenoxy; lower alkyl thio; lower alkyl thio substituted by hydroxy; phenylthio; phenylthio substituted by a member selected from the class consisting of chloro and sulfo; lower alkyl; phenyl; or phenyl substituted by a member selected from the class consisting of chloro, methyl, nitro and sulfo; and
F stands for a fluorine substituent.

2. An anthraquinone reactive dyestuff of claim 1 having the formula

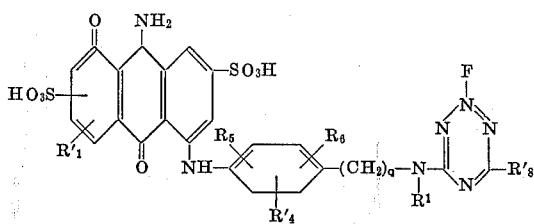

wherein
$R'_1$ represents hydrogen or sulfonic acid;
$R'_4$ denotes hydrogen or sulfonic acid;
$R_5$ and $R_6$ stand independently of one another for hydrogen, lower alkyl, lower alkoxy, or halogen;
$q$ stands for the number 1 or 2;
$R'$ stands for hydrogen or —$CH_3$;
F stands for a fluorine substituents; and,
$R'_8$ stands for lower alkylamino having 1 to 4 carbon atoms; lower alkoxy substituted lower alkoxy; lower alkoxy; phenylamino; sulfo phenylamina; disulfophenylamino; or benzylamino; wherein the lower alkoxy residues have 1 to 3 carbon atoms.

3. An anthraquinone reactive dyestuff of claim 1 having the formula

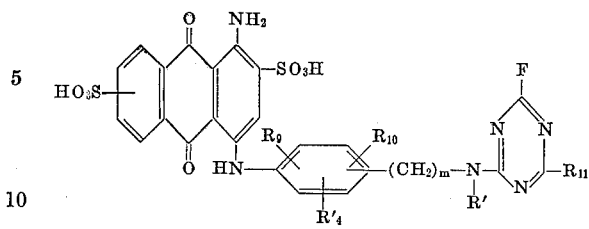

in which $R'_4$ represents hydrogen or a sulfonic acid group, $R_9$ represents hydrogen, lower alkyl, or a sulfonic acid group, $R_{10}$ stands for hydrogen or lower alkyl, $R_{11}$ represents phenylamino, sulphophenylamino, lower alkylamino, benzylamino, lower alkoxy or lower alkoxy substituted lower alkoxy, $m$ is the number 0 or 1, $R'$ denotes hydrogen or —$CH_3$ and F stands for a fluorine substituent.

4. The dyestuff of claim 1 having the formula

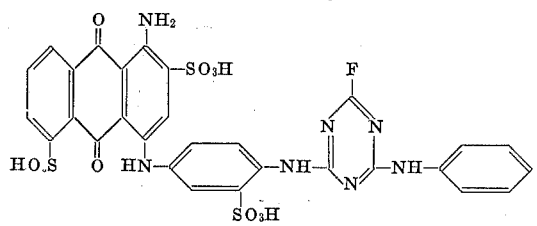

5. The dyestuff of claim 1 having the formula

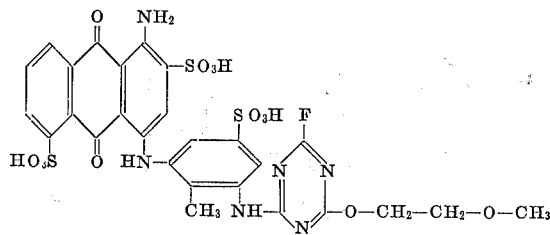

6. The dyestuff of claim 1 having the formula

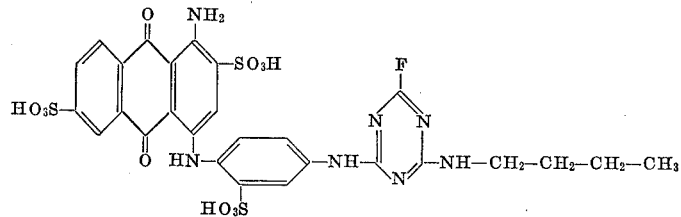

7. The dyestuff of claim 1 having the formula

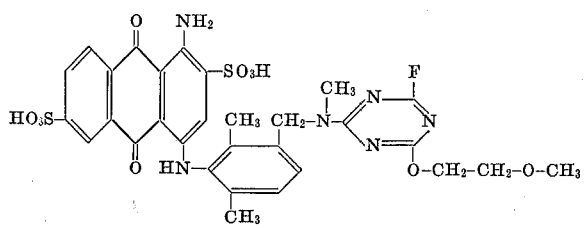

8. The dyestuff of claim 1 having the formula

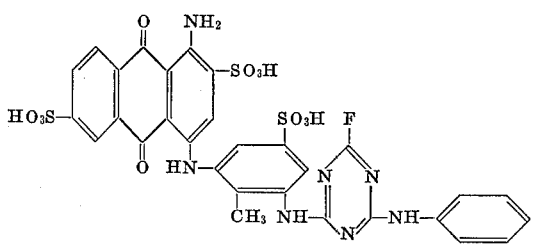

9. The dyestuff of claim 1 having the formula

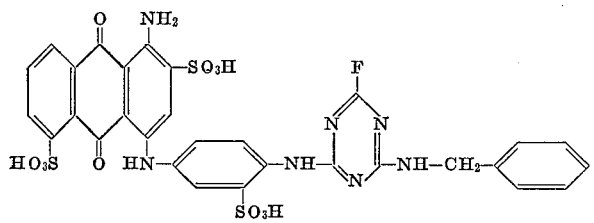

10. The dyestuff of claim 1 having the formula

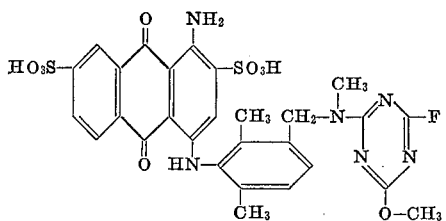

11. The dyestuff of claim 1 having the formula

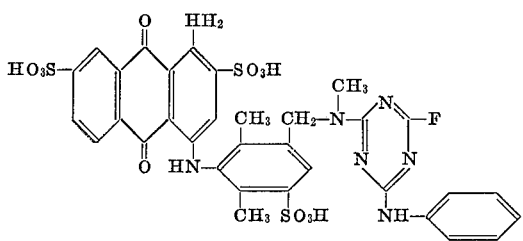

12. The dyestuff of claim 1 having the formula

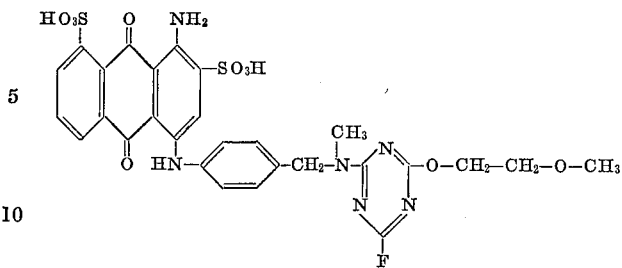

13. The dyestuff of claim 1 having the formula

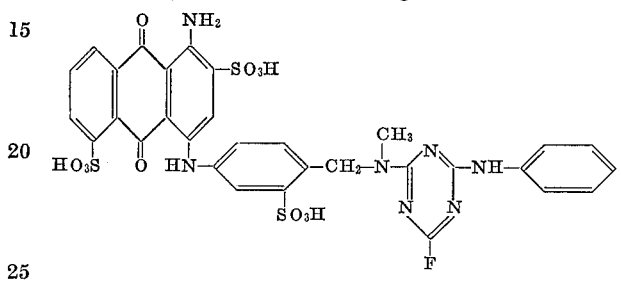

References Cited
UNITED STATES PATENTS

| | | | |
|---|---|---|---|
| 2,889,323 | 6/1959 | Heslop | 260—249 |
| 3,065,191 | 11/1962 | Heslop et al. | 260—249x |
| 3,251,844 | 5/1966 | Singer et al. | 260—249x |
| 3,415,825 | 12/1968 | Buehler et al. | 260—249 |

FOREIGN PATENTS

| | | | |
|---|---|---|---|
| 1,323,029 | 2/1963 | France | 260—249 |

HENRY R. JILES, Primary Examiner

J. M. FORD, Assistant Examiner

U.S. Cl. X.R.

8—39

UNITED STATES PATENT OFFICE
CERTIFICATE OF CORRECTION

Patent No. 3,558,620  Dated January 26, 1971

Inventor(s) Hans-Samuel Bien, Burscheid, Erich Klauke, Odent ~~Hahnenberg, and Klaus Wunderlich,~~

It is certified that error appears in the above-identified patent and that said Letters Patent are hereby corrected as shown below:

| COLUMN | LINE | ERROR |
|---|---|---|
| 1 | 1st form. | " 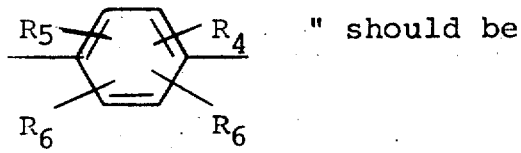 " should be --- 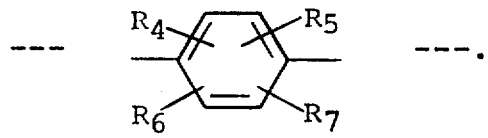 ---. |
| 1 | 46 | "...contains by..." should be --- ...contains, by... --- |
| 1 | 63 | "vauable" should be ---valuable--- |
| 2 | First Form. | " 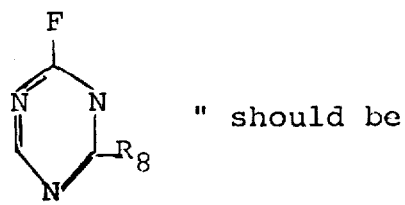 " should be |

UNITED STATES PATENT OFFICE
CERTIFICATE OF CORRECTION

Patent No. 3,558,620                  Dated January 26, 1971

Inventor(s) Hans-Samuel Bien, Burscheid, Erich Klauke, Odent Hahnenberg, and Klaus Wunderlich, It is certified that error appears in the above-identified patent and that said Letters Patent are hereby corrected as shown below:

| COLUMN | LINE | ERROR |
|---|---|---|
| 3 | | --- 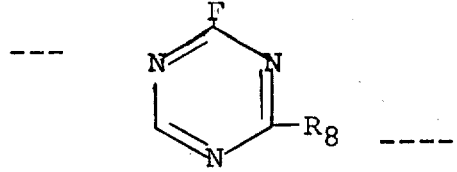 ---- |
| | | First Form. " 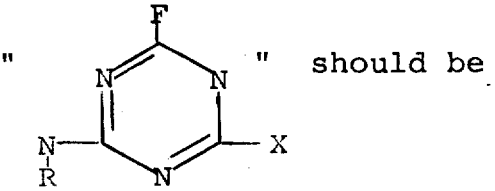 " should be |
| | | --- 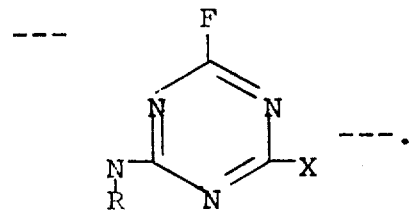 ---. |
| 3 | 52 | "tetraflurobortes" should be ---tetrofluoroborates---. |

UNITED STATES PATENT OFFICE
CERTIFICATE OF CORRECTION

Patent No. 3,558,620          Dated January 26, 1971

Inventor(s) Hans-Samuel Bien, et al.

It is certified that error appears in the above-identified patent and that said Letters Patent are hereby corrected as shown below:

| COLUMN | LINE | ERROR |
|---|---|---|
| 6 | 1st Formula | "$O.CH_3.CH_2.OCH_2$" should be ---$O.CH_2.CH_2.OCH_3$--- |
| 8 | 2 | "aquesous" should be ---aqueous---. |
| 9 | 73 | "phenylamina" should be ---phenylamino |
| 10 | Claim 5 | dependency of Claim 5 should be $\underline{3}$ instead of "1". |
| 10 | Claim 7 | dependency of Claim 7 should be $\underline{3}$ instead of "1". |
| 10 | Claim 8 | dependency of Claim 8 should be $\underline{3}$ instead of "1". |
| 11 | Claim 10 | dependency of Claim 10 should be $\underline{3}$ instead of "1". |
| 11 | Claim 11 | dependency of Claim 11 should be $\underline{3}$ instead of "1". |

UNITED STATES PATENT OFFICE
CERTIFICATE OF CORRECTION

Patent No. 3,558,620            Dated January 26, 1971

Inventor(s) Hans-Samuel et al.

It is certified that error appears in the above-identified patent and that said Letters Patent are hereby corrected as shown below:

COLUMN    LINE      ERROR 11        3rd Form.    " 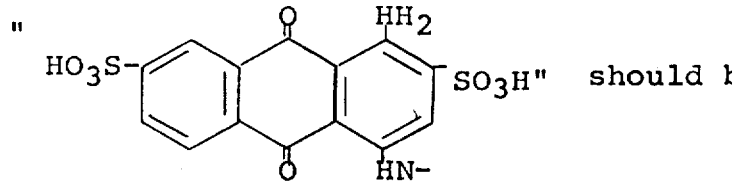 should be

--- 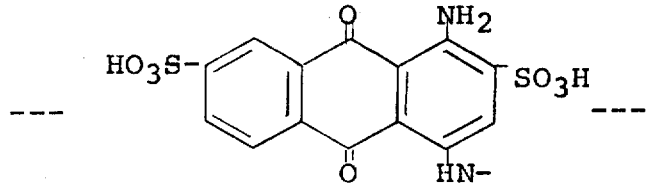 ---

Signed and sealed this 16th day of May 1972.

(SEAL)
Attest:

EDWARD M. FLETCHER, JR.          ROBERT GOTTSCHALK
Attesting Officer                Commissioner of Patents